E. W. PITTMAN.
ELECTRIC MOTOR CONTROL.
APPLICATION FILED MAR. 25, 1914.
1,236,005.
Patented Aug. 7, 1917.
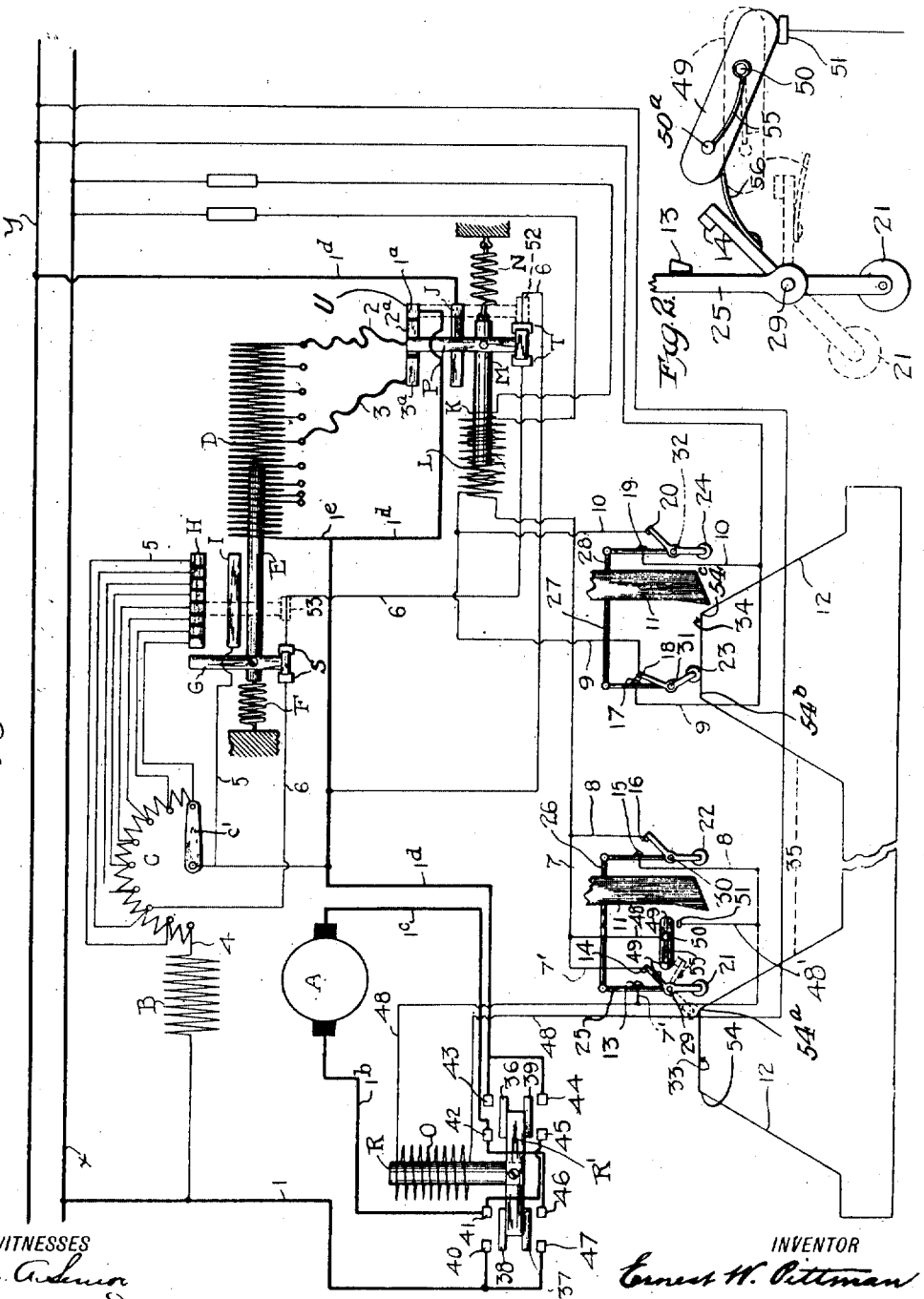
WITNESSES
INVENTOR
Ernest W. Pittman
BY
Stewart Perry
his ATTORNEY

UNITED STATES PATENT OFFICE.

ERNEST W. PITTMAN, OF FLUSHING, NEW YORK.

ELECTRIC-MOTOR CONTROL.

1,236,005.  Specification of Letters Patent.  Patented Aug. 7, 1917.

Application filed March 25, 1914. Serial No. 827,051.

*To all whom it may concern:*

Be it known that I, ERNEST W. PITTMAN, a citizen of the United States of America, residing at 243 Jamaica avenue, Flushing, county of Queens, State of New York, have invented certain new and useful Improvements in Electric-Motor Controls, of which the following is a specification.

My invention relates to improvements in means for controlling the operation of an electric motor where same is employed as a source of power in driving an apparatus having moving parts where it is desired to regulate the speed of the motor according to the circumstances or conditions incident to the operation of the machine.

I will describe my invention as same is applied in the operation of a machine tool such, for instance, as a planer wherein a cutting tool is caused to engage the object to be cut or planed and in such operation to enter and pass through the material of which such object is formed and to leave the object when the cutting has been accomplished. In the operation of such machines there are several stages which it is desirable to note: first, that in the operation of the said machine the transfer from one cutting position to another be accomplished as rapidly as possible to conserve the time incident to such transfer; second, it is desirable that the cutting tool should enter the work at a speed preferably below the normal rate in order that the shock incident to such contact will be minimized; third, it is also desirable that the speed of the tool through the material acted upon should be proportionate to the resistance of the material; fourth, it is undesirable that the cutting tool should leave the material upon which it is acting at a higher rate of speed than that employed during its passage through the work, as the last fragment of the work is often not sufficient to resist the cutting operation when accomplished at a high rate of speed, resulting often in a chipping or flaking of the edge of the material acted upon; fifth, it is also desirable in a reciprocating machine, such as a planer, to reverse the stroke after the tool leaves the work as speedily as possible and to restore the respective parts to their cutting position. It is the purpose of my invention to supply means by which these desirable results may be attained.

I have illustrated my invention in the accompanying drawing, wherein the figure is a diagrammatic view illustrative of the operation of my invention, the parts being designated by letters and numerals, like characters and numerals referring to like parts.

I have elected to describe my invention as the same may be applied to a planer. I deem it unnecessary to illustrate the mechanical parts, all of which are well known and understood. I have therefore confined my illustration to a diagrammatic form, which I believe to be sufficient to efficiently disclose my invention. I have designated the parts by letters and numerals, referring to like parts by like letters or numerals.

A represents a motor armature; B is the shunt field of the motor; C is the field rheostat; D is a solenoid; E is the core of the solenoid D; F is the spring connected at one end to the core E and suitably anchored at the other end. G is a bridge mounted on the core E to move therewith. H is a series of contact points insulated from one another and each connected to the corresponding point in the field rheostat. I is a bar contact; J is a bar contact; U is a series of contact points; $1^a$, $2^a$ and $3^a$, K and L are solenoids, preferably located so as to act over the same region. M is a core for the two solenoids K and L, acting against a resistance such as the spring N, secured at one end to the core M and suitably anchored at the other end. The core M carries the bridge P, which moves therewith. S is a pair of contact points spanned by one end of the bridge G. T is another pair of contact points spanned by one end of the bridge P. O is a solenoid; R is a core for the same; $R^1$ is a cross bar secured to one end of the core R carrying the contact bars 36, 37, 38 and 39. 11—11 are diagrammatic representations of the cutting tool such as is commonly employed in a planer; 25, 26, 27 and 28 are diagrammatic representations of brackets suitably mounted on some part of the planer, adapted to reciprocate therewith or to be acted upon by reciprocating objects. At the end of these brackets are pivotally mounted bell cranks 29, 30, 31 and 32, carrying at one end the rollers 21, 22, 23 and 24, and at the other end the contact points 14, 16, 18 and 20, to which are opposed corresponding contact points mounted on the brackets, same being designated as 13, 15, 17 and 19. 40 to 47, inclusive, are contact points. 49 is a bridge pivoted at 50, and 51 is a contact point. Secured to the under side of contact point 14 is a knife spring 56 adapted in the rotation of the bell crank to engage the under side of the rocker arm 49, and to retain such engagement until points 13 and 14 engage. 12—12 is a figurative representation of two pieces of work or two portions of the same piece of work set in the path of the operation of the planer, referred to hereinafter as the object or material to be acted on, the same having the surfaces 33 and 34 bounded by a contour 54 54ª, 54ᵇ, 54ᶜ.

I will now describe the circuit connections. 1 is the armature circuit, the course of which is as follows:—Beginning with the main line at X, it traverses the course 1 to the contact points 40 and 47. When it is desired to lead the current to the armature to operate the same in one direction, the solenoid O is energized, thus lifting the core R and the core bar R¹, carrying the contact bars 36 to 39, inclusive. With this operation the electrical connection is made between the contact points 40 and 41 and the current is led through the line 1ᵇ to the armature; thence by 1ᶜ to the contact point 42 through bridge 36 to the contact point 43; thence by the line 1ᵈ; thence to the contact point 1ª, bridge P, contact bar J to the main line Y. If I desire to lead the current to the armature in the reverse direction and thus reverse the rotary movement, I demagnetize the solenoid O, which releases the core R and permits the same to fall under the power of gravity or otherwise, thus causing bar contacts 37 and 39 to span the contact points 44, 45, 46 and 47. The armature current will now flow in the line 1, contact point 47, bridge 37, contact point 46, contact point 42 to the armature A, line 1ᵇ, contact point 41, contact point 45, bar contact 39, contact point 44 to the main line through 1ᵈ as heretofore described.

Under certain conditions hereafter described, I divert the course of the armature circuit and lead the same through the whole or part of the windings of the solenoid D to the contact points 2ª and 3ª, and thus through the bridge P, and contact bar J to the main line.

B is the field winding; C is the field rheostat; C¹ is the rheostat lever arm; H are a series of contact points insulated from each other and connected to various points of the rheostat by the connections 5. When connected by the bridge G with the contact bar I, the circuit is made to the armature circuit through 5, thus short circuiting one or more of the resistances of the rheostat. 6 is a shunt circuit short circuiting a predetermined number of the rheostat resistances. Interposed in this circuit are two gaps indicated as S and T. These gaps are bridged by one end of the bridges G and P, respectively.

Circuit (48—7'—7) (48—48'—7) (48—8—7) includes solenoid K and solenoid O, connected in series. This circuit may be completed by making contact between points 13 and 14, 15 and 16, or 50, 51. (9—7) is a similar circuit, including the solenoid L and is made by the contact points 17, 18 or 19, 20.

The mounting of the mechanical parts, such as the cutting tool and the work to be acted upon as in a planer, is well understood. In the present device, the brackets 26 and 27 are so mounted with reference to the work that the bell cranks 29 to 32, which are pivotally connected at the end of said brackets, transverse the path of the operation of the machine in such relation to the surface of the work acted upon by the cutting tool that as they traverse the path of the tool or adjacent thereto, that they will impinge upon the surface of the object to be cut as 33 and 34 and in approaching said surface will be guided by the contour of said surface as 54, 54ª, 54ᵇ, 54ᶜ, 54ᵈ. 49 is a bar contact suitably pivoted at 50. 51 is a contact point adapted to coöperate therewith as the said bar is rocked on its pivot. 55 is a knife spring secured to the shaft 50 and freely connected with the bar 49 at 50ª; said spring operating to maintain said bar 49 in a normally horizontal position.

The operation of the bell crank levers in engaging the work and making and breaking the contacts to establish electrical circuits is briefly as follows:—In the reciprocal movement of the machine from right to left, we will say, by way of illustration, that the roller 21 engages the contour of the work at 54ª and causes the rotation of the bell crank on its pivot 29 until it eventually rides on the surface 33, as illustrated with respect to the roller 23. By this operation contact is made between the contact points 13 and 14. In like manner when the wheel 22 engages said contour of the work to be acted on 54ª, it is operated in manner similar to that described as the operation of the wheel 21, and as a result contact points 15 and 16 are caused to engage, thus closing the circuit 48. When in the continued reciprocal movement of the machine in the same direction, i. e. from right to left, the rollers 21 and 22 leave the surface of the work and fall again to a vertical position, either under the power of gravity or otherwise, the contact points 13 and 14 and 15 and 16 are separated and the circuit (48—7'—7)—(48—48'—7)—(48—8—7) is broken. When, however, the direction of the reciprocal movement of the planer is reversed, moving now from left to right, the roller 22 engages the opposite contour of the work at 54 lying in its reciprocating path and such contact operates to cause the bell crank 30 to rock on its pivot and in like manner the bell crank 29 to rock until one arm thereof, to-wit the arm carrying the contact point 14, operates to engage one end of the pivoted contact lever 49 and to depress said lever throwing the same out of the path of the rotating arm 14 until that arm has described an arc beyond the arc of rotation of the arm 49. The arm 49 is then restored to its horizontal position by suitable means such, for instance, as a spring 55, when in the continued reciprocal operation of the machine in the same direction the wheel 21 traverses the surface 33 and falls again into a vertical position, the rotation of the bell crank incident thereto causes the end 14 of said bell crank to engage the end of the bar contact 49 operating to rock the same and bring it into contact with the contact point 51, thus closing the circuit (48—48'—7), thus reversing the motor as heretofore described. The knife spring 56 secured to the crank arm carrying the contact 14 is provided to engage the rocker arm 49 and retain such engagement temporarily while said points 13 and 14 are approaching engagement, and to release the same just prior to such engagement. And in the further rotation of the said bell crank on its pivot 29, the contact points 13 and 14 are brought together again, maintaining the circuit 7—7'—48.

It will, of course, be understood that the mechanical apparatus and its engagement is figurative and diagrammatic. The same may be varied to meet the circumstances and conditions in the operation of any particular machine. The physical contact affecting the operative members to make or break the circuits hereinafter described may be accomplished by the engagement of any moving parts of the apparatus or mechanism in contact with any other part of the mechanism so long as such contacts synchronize with the operations hereafter described.

The operation of my device is as follows:—In the primary or neutral position of the parts the bridge P is in the position shown in dotted lines at 52 and the wheel contact 23 is out of engagement with the work 12; that is to say, out of contact with the surface 34. Under these conditions the solenoid O is demagnetized and falls under the power of gravity or otherwise and contact is made between the bar contacts 37 and 39 and the corresponding contact points 44 to 47, inclusive. We will assume, therefore, that the cutting tools 11—11 and the rollers 21 to 24, inclusive, are remote from the work 12 at the time when the planer is set in motion. The rheostat lever $C^1$ is also in its primary position. After starting the motor this lever $C^1$ is thrown to its extreme position, as indicated in the drawing. This operates to bring the machine to full speed.

The armature current flowing through the circuit 1, contact point 47, bar contact 37, contact point 46, contact point 42, line $1^c$, and then $1^b$, contact point 41, contact point 45, bar contact 39, contact point 44, line $1^d$; thence to contact point $1^a$ through the bridge P to the bar contact J and thence to the main line Y. Assuming that the direction of the motor is to drive the work toward the cutting tool, it will be seen that such path will be traversed at the full speed of the motor. As the wheels 21 to 24 are located in the path of the work, it will be apparent that the wheel as 21 will engage the contour of the work as $54^a$ and will ride on the surface as 33, thus rocking the bell crank on its pivot 29 and thus making contact between the contact points 13 and 14, and thereby closing the circuit (48—7'—7). The position last described is diagrammatically shown in the position of the wheel 23 with reference to the surface of the work. In the latter case the circuit 9 is made by the contact illustrated. The operation of the circuits (48—7'—7)—(48—48'—7)—(48—8—7) is identical with 9 and 10 except in that the former are in series with circuit 48; consequently a description of one will suffice for the others. The only reason for having two sets of circuits is to provide a greater pull on the core M, for the purpose of transferring the bridge P in its respective relation to the contact points $1^a$ and $2^a$ and $3^a$, for purposes which will be hereafter more fully described.

When the circuit (48—7'—7) is made, as stated, by reason of the contact between the roller 21 and the work, the solenoid K is energized, thus operating to move the core M, and consequently the bridge P mounted thereon, against the power of the spring N; that is to say, from its primary position, as shown in dotted lines at 52 to its secondary position as shown in full lines. This operates to close the gap T and make the circuit 6. It also operates to break the contact at $1^a$ and make the similar contact at $2^a$, thus leading the armature circuit through the entire length of the solenoid D, through the bridge P, bar contact J to the main line. The making of the circuit 6 operates as a shunt to cut out a portion of the rheostat and hence slow down the motor. The amount of the resistance cut out by this shunt may be predetermined and hence the speed of the motor by this means may be regulated at a predetermined rate. I prefer that the rate should be reduced to a point somewhat below the normal rate of the operation of the cutting tool as it passes through the work. The purpose of thus slowing down the motor is to bring the tool to the work at a reduced speed. I find it to be desirable that the tool should enter the work under these conditions.

As soon as the tool 11 enters the work, a physical resistance is opposed to its operation which is dependent on the nature of the material to be cut, also the size of the cut. I have also observed that the resistance to the cutting tool often varies after the tool has entered the work and during its path through the material, dependent upon the nature of the material, which often presents hard spots which offer greater resistance to the tool, so that it will be understood that there is a possibility of a varying resistance to the operation of the tool from the beginning to the end of its cut. I have also observed that as the tool approaches the contour of the work preparatory to leaving the same, such contour is apt to flake off or chip, due to the pressure exerted by the tool. I find it desirable, therefore, to control the speed of the motor to meet these conditions. This is accomplished by the employment of a wheel as 22, which is intended to follow the tool through the work but still retain its connection with the surface of the work until the tool has passed completely through the same, thus operating to prevent the motor from speeding up while said wheel 22 remains in contact with the work.

To recur now to the operation which was incident to the closing of the circuit (48—7'—7), it will be recalled that the bridge P was transferred from the contact point 1ᵃ to the contact point 2ᵃ, and it will be recalled that this adjustment made the armature circuit through the solenoid D. Under the plan of adjustment which I here propose, it is intended that the tension of the spring F shall be sufficient to overcome any magnetic force that may be generated in the solenoid D by reason of the passing of the armature current through the coils of that solenoid, prior to the engagement of the tool, thus retaining the bridge G in its primary position. As soon, however, as the work 12 engages the tool 11, a resistance to the movement of the parts is presented, which is immediately translated into an additional load on the motor thus causing a flow of current proportioned to the load. With this increase of current a greater magnetic force is generated in the solenoid D and the core is affected thereby, such force being sufficient to overcome the fixed tension of the spring F operating to draw the core E and the bridge G carried thereby toward the solenoid D, thus opening the gap S and thereby breaking the circuit 6 and at the same time making contact between one of the insulated contact points H and making one of the shunt circuits 5 through the rheostat C. It will, therefore, be understood that with the varying load on the motor the magnetic force in the solenoid D will vary proportionately and in a like manner the reciprocating movement of the core will establish or reëstablish the shunt circuits through the rheostat C, thus varying the resistance and consequently the speed of the motor. It will, of course, be understood that the degree of movement of said rheostat control will be dependent on the amount of pull exercised by the spring F and that such pull may be variable and adjustable according to a predetermined rate ratio between the current and the resistance as may be most suitable or convenient in the operation of the mechanism. It will therefore be understood that during the period when the work is approaching the tool and during the time that the work is engaged by the roller as 21, and while the cutting tool is not in operation, the speed of the motor may be said to be in the control of the circuit 6, but as soon as the additional load incident to the cutting operation is thrown on the motor the speed of the machine may be said to be in the control of the solenoid D in combination with the spring F, it being understood that the operation of these elements is dependent on the current and the current on the load. An accurate proportion may be here established dependent upon well known mechanical and electrical conditions and, as previously stated, the speed of the tool through the work will be regulated according to the resistance presented to the tool.

In the reciprocal operation of the planer, it will be obvious that the wheel 21 will leave the work before the tool has completed its cutting operation, but I prefer to so arrange the relations between the wheels 21 and 22 so that the wheel 22 will be in contact with the work at the time when the wheel 21 has left the same. By this latter contact, it will be understood that I establish the circuit 7 by uniting the contact points 15 and 16, so that notwithstanding the fact that the wheel 21 has run off the work and the contact between the contact points 13 and 14 is broken, still the parallel circuit (48—8—7) will be maintained and the same results follow until the tool has entirely traversed and left the work. When the tool leaves the work the armature current is again reduced so that the solenoid D moves in response to the power of the spring F without resistance and the gap S in the circuit 6 is again closed, thus reëstablishing the shunt circuit 6 and slowing down the motor until such time as the wheel 22 leaves the face of the work when said shunt 6 is immediately broken and the motor proceeds at full speed ahead.

I have illustrated a plurality of tools and also a plurality of rollers making contact with the surface of the work. Their electrical operations correspond with the exception that one group control the solenoid K, and solenoid O, while the other group control the solenoid L, both operating in the same field and on the same core M. My purpose in this is to provide means for cutting out a number of the turns of wire of the solenoid D, where the balancing of its magnetic resistance against the mechanical resistance F is desired, and to maintain at all times the relation between the operating parts which shall be under the control of a member contacting with the surface of the work. The operation of this mechanism is as follows: Where one or more of the wheels controlling the shunt circuit 6 are in contact with the surface of the work, said shunt circuit will be maintained unless broken at the point S. Where there are a plurality of tools operating and in the balancing of the load against the resistance above described, I desire to cut out a part of the solenoid D when an additional tool is brought into operation, I provide the secondary circuits 9 and 10 leading to the solenoid L. If the circuits (48—7′—7) or (48—8—7) are closed at the same time with either of the circuits 9 or 10, both of the solenoids L and K will be energized as opposed to the spring N, and as their magnetic force is assumed to be equal, it will be apparent that the pull on the core M will be doubled, thus operating to move the bridge P from the contact point 2ª to the contact point 3ª, thus leading the armature circuit through only a part of the solenoid D as at 3, thus reducing the number of turns in D when the strength of the current in D is increased and keeping the magnetic force of D constant. This operates to keep the cutting speed the same whether one or two tools are in operation. This same result may be accomplished by mechanical means such as regulating the tension of the spring F according to a predetermined ratio as heretofore stated.

In the foregoing description I have assumed that the planer was moving in one direction. It is desirable that such direction should be reversed as speedily as possible after the tool has left the work, thus economizing the time incident to the removing of the work from one operative position to another. This I accomplish as follows: During the period that the wheel 21 or any other of a plurality of wheels operating the same mechanism is in contact with the work, the circuit (48—7′—7) is made by reason of contact between the contact points 13 and 14. This circuit operates to energize the solenoid O and lift the core R, making contact with the contact points 40 to 43, respectively, and giving the motor a rotary motion in one direction. As soon as the wheel 21 or the last of a plurality of wheels operating in a similar manner leaves the work, the circuit (48—7′—7) is broken by the fact that the bell crank is turned on its pivot 29, the lower arm of the bell crank assuming a vertical position, thus breaking the contacts 13 and 14, and the contact bar R¹ falls under the power of gravity or otherwise and makes contact between the contact bars 37, 39 and the contact points 44 to 47 inclusive, thus causing a delivery of current to the motor in an opposite direction and hence a reversal of its rotation. This reverse movement of the motor will, of course, develop a reverse reciprocal movement in the planer and the wheel 21 or any one of the wheels of a kindred nature and in a similar position will engage the opposite side of the work as at the point or contour 54 incident to the reciprocal movement and travel over the same path on the face of the work as it had previously traveled in the opposite direction, the result being that the bell crank, one end of which is connected with said wheel 21, will be turned on its pivot 29 describing a more extended arc than that of its previous motion, causing the back side of the opposite arm to engage and pass behind the pivot contact bar 49, as shown in dotted lines, it being understood that the contact bar 49 is pivotally connected at 50 with a suitable spring to restore the same to its normal position after the arm of the bell crank has passed beyond contact therewith. I have indicated such a spring as 55. As the roller passes off of the surface 33, at the contour 54ª, it falls into a vertical position by the power of gravity or otherwise and in so doing its opposite arm engages the pivotal contact lever 49 causing the same to make contact with the contact point 51 thus again completing the circuit (48—48′—7) and energizing the armature O, thus lifting the core R and making the contacts to establish the armature circuit in the reverse direction. This, of course, operates to reverse the reciprocal movement of the planer. Then all of the steps previously described are repeated again and again.

I have stated that those incidents applicable to the operation of the rollers 21 to 24 are the same. This is true with the exception that in operating a reciprocating machine, I confine the means for reversing the motor to the wheel following the tool. It will be understood that in all of the operations above described, I have dealt with them theoretically and illustrated them diagrammatically. I do not intend to limit my claims to any specific form of mechanism either mechanical or electrical so long as the fundamental principles disclosed herein are utilized.

From the foregoing it will be apparent that by the means stated, I am able to shift the work from one operative position to another when not in engagement with the tool at the maximum speed of the motor, to slow down such speed as the work approaches the tool, to regulate the speed during the course of its operation through the work dependent on the resistance offered by the work to the tool, to control the speed at which the tool finally escapes from the work after the load is either wholly or partly lifted from the motor, sufficient at all events to throw the core E back again into the power of the spring F and thus restore the shunt circuit 6, to reverse the motor as soon as the last of the contact wheels 21 to 24 leaves the work, to again reverse the motor as soon as the contact wheels 21 to 24, or the last of them, leaves the work and so continuously to operate the planer to reciprocate and to cause a reverse movement of the planer adjacent to the contour or edge of the horizontal plane of the surface of the work. It will be apparent, therefore, that no matter what this contour may be, whether of regular or irregular form, whether in one position or another with reference to the tool, the reverse movement will be accomplished as soon as the last roller leaves the surface of the work adjacent its contour.

I have illustrated the tools 11—11 and brackets 25 to 28 as in tandem. In the operation of a planer these elements would be mounted to reciprocate in parallel paths, but they would be mounted in a plane at right angles to such path. This is my purpose in the illustration but it will be understood that their position may be varied to any position consistent with the operation that I have described.

Where I have referred to a rheostat as an element in this specification and claims, I desire to have the same understood in its generic sense, to indicate any means adapted to control the speed of the motor through a variation of the magnetic effect of its field on the armature of the motor.

What I claim is:—

1. In an apparatus of the class described, a motor, a rheostat interposed in the field circuit, a machine tool having parts moving in a prescribed path, adapted to operate upon a suitably mounted object which has a contour comprising a surface operated upon by said tool, means carried by said machine tool and controlled by contact with the said surface as the path of its operation is traversed to control a shunt circuit through said rheostat, thereby regulating the speed of the motor and means to break said last mentioned shunt circuit when the motor is subject to the load and restore the same when relieved of the load.

2. In an apparatus of the class described, a motor, a rheostat interposed in the field circuit, a machine tool having parts moving in a prescribed path, adapted to operate upon a suitably mounted object which has a contour comprising a surface operated upon by said tool, means carried by said machine tool and controlled by contact with the said surface as the path of its operation is traversed to control a shunt circuit through said rheostat, thereby regulating the speed of the motor and means to break said last mentioned shunt circuit when the motor is subject to the load and restore the same when relieved of the load, and means to control the direction of the drive controlled by the disengagement between the surface of said object according to its contour and said speed controlling means which is controlled by contact with the surface of the object.

3. In an apparatus of the class described, a motor, a rheostat interposed in the field circuit, an armature circuit in which is included a solenoid with a core, means to regulate the movement of said core as opposed to the operation of the magnetic force acting thereon, through said solenoid, according to the load on the motor, means to control the rheostat operated by the movement of the core, a machine tool having parts moving in a prescribed path, adapted to operate upon a suitably mounted object which has a contour comprising a surface operated upon by said tool, means carried by said machine tool and controlled by contact with the said surface as the path of its operation is traversed to control a shunt circuit through said rheostat thereby regulating the speed of the motor and means operated by said core to make or break said last mentioned circuit.

4. In an apparatus of the class described, a motor, a rheostat interposed in the field circuit, an armature circuit in which is included a solenoid with a core, means to regulate the movement of said core as opposed to the operation of the magnetic force acting thereon, through said solenoid according to the load on the motor, means to control the rheostat operated by the movement of the core, a machine tool having parts moving in a prescribed path, adapted to operate upon a suitably mounted object which has a contour comprising a surface operated upon by said tool, means carried by said machine tool and controlled by contact with the said surface as the path of its operation is traversed to control a shunt circuit through said rheostat thereby regulating the speed of the motor and means operated by said core to make or break said last mentioned circuit and means to control the direction of the drive controlled by the disengagement between the surface of said object according to its contour and said speed controlling means which is controlled by contact with the surface of the object as stated.

5. In an apparatus of the class described, a motor, a rheostat interposed in the field circuit, an armature circuit in which is included a solenoid with a core, means to lead said armature circuit through more or less of the helix of said solenoid, means to regulate the movement of said core as opposed to the operation of the magnetic force acting thereon through said solenoid according to the load on the motor, means to control the rheostat operated by the movement of the core, a machine tool having parts moving in a prescribed path, adapted to operate upon a suitably mounted object which has a contour comprising a surface operated upon by said tool, means carried by said machine tool and controlled by contact with the said surface as the path of its operation is traversed to control a shunt circuit through said rheostat thereby regulating the speed of the motor and also to control the course of said armature circuit through more or less of the windings of said solenoid according to the load on the motor, and means operated by said core to control said shunt circuit through said rheostat which as stated controls the speed of the motor.

6. In an apparatus of the class described, a motor, a rheostat interposed in the field circuit, an armature circuit in which is included a solenoid with a core, means to lead said armature circuit through more or less of the helix of said solenoid, means to regulate the movement of said core as opposed to the operation of the magnetic force acting thereon through said solenoid according to the load on the motor, means to control the rheostat operated by the movement of the core, a machine tool having parts moving in a prescribed path, adapted to operate upon a suitably mounted object which has a contour comprising a surface operated upon by said tool, means carried by said machine tool and controlled by contact with the said surface as the path of its operation is traversed to control a shunt circuit through said rheostat thereby regulating the speed of the motor and also to control the course of said armature circuit through more or less of the windings of said solenoid according to the load on the motor, and means operated by said core to control said shunt circuit through said rheostat which as stated controls the speed of the motor and means to control the direction of the drive controlled by the disengagement between the surface of said object according to its contour and said speed controlling means which is controlled by contact with the surface of the object as stated.

7. In an apparatus of the class described, a motor, a rheostat interposed in the field circuit, a machine tool having parts moving in a prescribed path, adapted to operate upon a suitably mounted object which has a contour comprising a surface operated upon by said tool, a member pivotly mounted and carried by said machine tool and operating in the path of its movement to engage and disengage the said contour and surface acted on by the tool and by such contact rocked on its pivot, means controlled by the rocking movement of said member to control the field circuit through said rheostat and thus regulate the speed of the motor, and means to break the circuit thus controlled by said rocking movement when the motor is subject to the cutting load and to restore the same when relieved of such load.

8. In an apparatus of the class described, a motor, a rheostat interposed in the field circuit, a machine tool having parts moving in a prescribed path, adapted to operate upon a suitably mounted object which has a contour comprising a surface operated upon by said tool, a member pivotally mounted and carried by said machine tool and operating in the path of its movement to engage and disengage the said contour and surface acted on by the tool and by such contact rocked on its pivot, means controlled by the rocking movement of the said member to control the field circuit through said rheostat and thus regulate the speed of the motor, and means to break the circuit thus controlled by said rocking movement when the motor is subject to the cutting load and to restore the same when relieved of such load, means to control the direction of the drive of the motor controlled by the rocking of the said member as it engages or disengages the contour and surface of the object.

9. In an apparatus of the class described, a motor, a rheostat interposed in the field circuit, an armature circuit in which is included a solenoid with a core, means to regulate the movement of the said core as opposed to the operation of the magnetic force acting thereon through said solenoid according to the load on the motor, means to control the rheostat operated by the movement of the core, a machine tool having parts moving in a prescribed path, adapted to operate upon a suitably mounted object which has a contour comprising a surface operated upon by said tool, a member pivotally mounted and carried by said machine tool and operating in the path of its movement to engage and disengage the said contour and surface acted on by the tool and by such contact rocked on its pivot, means controlled by the rocking movement of the said member to control the field circuit through said rheostat and thus regulate the speed of the motor during that period when the tool is approaching or leaving the work and means controlled by the movement of the core of the solenoid to break the circuit under the control of the last mentioned means when the tool enters the work and during the period that the motor is subject to the cutting load but to restore the same when the cutting operation is concluded.

10. In an apparatus of the class described, a rheostat interposed in the field circuit, an armature circuit in which is included a solenoid with means to lead said circuit through more or less of the windings of said core, a core for said solenoid, means to regulate the movement of said core as opposed to the operation of the magnetic force acting thereon through said solenoid according to the load on the motor, means to control the rheostat operated by the movement of the core, a machine tool having parts moving in a prescribed path, adapted to operate upon a suitably mounted object which has a contour comprising a surface operated upon by said tool, a plurality of members pivotally mounted and carried by said machine tool and operating in the path of its movement to engage and disengage the said contour and surface acted on by the tool, and by such contact pivotally rocked, means controlled by said rocking movement of said members to control the field circuit through said rheostat and thus regulate the speed of the motor during the period when the tool is approaching or leaving the work, and means controlled by the movement of the core of the solenoid to break the circuit under control of the last mentioned means when the tool enters the work and during the period that the motor is subject to the cutting load, but to restore the same when the cutting operation is concluded, and means also operated by said rocking members as the same are pivotally operated by contact with the surface of said object or disengagement therefrom to control said means to lead the armature through more or less of the solenoid windings, the same dependent on the number of rocking members in or out of engagement with the surface of the object being acted on by the cutting tool or tools.

11. In an apparatus of the class described, a machine adapted to exert power, a motor to drive said machine, a rheostat interposed in the field circuit of said motor and a solenoid interposed in its armature circuit, said solenoid having a core, a resistance opposed to the movement of said core proportioned to the magnetic force developed in the solenoid according to the load on the motor, means controlled by the movement of said core to operate the rheostat and thus control the speed of the motor, means operated by engagement between moving parts of the electrically driven machine to control the rheostat before said solenoid is energized and after the same is deënergized.

12. In an apparatus of the class described, a machine adapted to exert power, a motor to drive said machine, a rheostat interposed in the field circuit of said motor and a solenoid interposed in its armature circuit, said solenoid having a core, a resistance opposed to the movement of said core proportioned to the magnetic force developed in the solenoid according to the load on the motor, means controlled by the movement of said core to operate the rheostat and thus control the speed of the motor, means operated by engagement between moving parts of the electrically driven machine to control current to the motor to control the direction of its operation.

13. In an apparatus of the class described, a machine adapted to exert power, a motor to drive said machine, a rheostat interposed in the field circuit of said motor and a solenoid interposed in its armature circuit, said solenoid having a core, a resistance opposed to the movement of said core proportioned to the magnetic force developed in the solenoid according to the load on the motor, means controlled by the movement of said core to operate the rheostat and thus control the speed of the motor, means operated by engagement between moving parts of the electrically driven machine to control current to the motor to control the direction of its operation, means operated by engagement between moving parts of the electrically driven machine to control the rheostat before said solenoid is energized and after the same is deënergized.

14. In an apparatus of the class described, a machine adapted to exert power, a motor to drive said machine, a rheostat interposed in the field circuit of said motor and a solenoid interposed in its armature circuit, said solenoid having a core, a resistance opposed to the movement in the solenoid according to the load on the motor, means controlled by the movement of said core to operate the rheostat and thus control the speed of the motor, means operated by engagement between moving parts of the electrically driven machine and a suitably mounted object which has a contour comprising a surface operated upon by said machine to control current to the motor to control the direction of its operation, means operated by engagement between moving parts of the electrically driven machine to control the rheostat before said solenoid is energized and after the same is deënergized, means operated by engagement between a plurality of moving parts of said electrically driven machine and a suitably mounted object which has a contour comprising a surface operated upon by said machine to control the degree of magnetic force in the solenoid.

15. In an apparatus of the class described, a motor, a rheostat interposed in the field circuit, a machine tool having parts operating in a prescribed path, an object suitably mounted to be operated on by said tool as it moves in said path, said object having a surface to be acted on by said tool and means carried by said machine tool and controlled by contact with the surface of said object as the path of its operation is traversed to control a shunt circuit through said rheostat thereby regulating the speed of the motor.

16. In an apparatus of the class described, a motor, a rheostat interposed in the field circuit, a machine tool having parts moving in a prescribed path adapted to operate upon a suitably mounted object, an object suitably mounted in the path of said movement, said object having a contour comprising a surface operated upon by said tool, means carried by said machine tool and controlled by contact with the surface of said object as the path of its operation is traversed to control the direction of the current to the armature, thus determining the direction of rotation of the motor.

Signed by me at New York this 21st day of March, 1914.

ERNEST W. PITTMAN.

Witnesses:
CHARLES D. EDWARDS,
MARGARET V. VOGEL.

Copies of this patent may be obtained for five cents each, by addressing the "Commissioner of Patents, Washington, D. C."